(12) United States Patent
Katsuki et al.

(10) Patent No.: US 12,078,188 B2
(45) Date of Patent: Sep. 3, 2024

(54) FAN MOTOR

(71) Applicant: MINEBEA MITSUMI Inc., Nagano (JP)

(72) Inventors: Shinichi Katsuki, Sagamihara (JP); Naohiro Yamada, Yokohama (JP); Takafumi Kodama, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 165 days.

(21) Appl. No.: 17/758,735

(22) PCT Filed: Feb. 22, 2021

(86) PCT No.: PCT/JP2021/006690
§ 371 (c)(1),
(2) Date: Jul. 13, 2022

(87) PCT Pub. No.: WO2021/199795
PCT Pub. Date: Oct. 7, 2021

(65) Prior Publication Data
US 2023/0039041 A1    Feb. 9, 2023

(30) Foreign Application Priority Data

Mar. 30, 2020   (JP) .................................. 2020-059255

(51) Int. Cl.
*H02K 11/30* (2016.01)
*F04D 29/52* (2006.01)
(Continued)

(52) U.S. Cl.
CPC .............. *F04D 29/52* (2013.01); *H02K 5/08* (2013.01); *H02K 5/15* (2013.01); *H02K 5/22* (2013.01); *H02K 11/30* (2016.01)

(58) Field of Classification Search
CPC . H02K 11/30; H02K 5/08; H02K 5/15; H02K 5/22
(Continued)

(56) References Cited

U.S. PATENT DOCUMENTS 6,359,354 B1    3/2002  Watanabe et al.
2020/0291949 A1  9/2020  Kim

FOREIGN PATENT DOCUMENTS

DE    102011013662 A1 *  9/2011  ........... F04D 25/062
DE    102018110822 A1 * 11/2018  ......... F04D 25/0646
(Continued)

OTHER PUBLICATIONS

English translation of the Written Opinion for corresponding International Application No. PCT/JP2021/006690 dated Apr. 27, 2021.
(Continued)

*Primary Examiner* — Jose A Gonzalez Quinones
(74) *Attorney, Agent, or Firm* — Pearne & Gordon LLP

(57) ABSTRACT

A fan motor according to an embodiment includes a bearing holder, a stator, a circuit board, and a synthetic resin. The stator is mounted at an outer circumference of the bearing holder. The circuit board is electrically connected to a coil of the stator, is mounted at a surface of the base part at an opposite side to the bearing holder, and extends from a base part to a connector housing. The synthetic resin seals the bearing holder, the stator, and the circuit board, except for both end faces of the bearing holder. The connector housing has a gate opening that is injected with the synthetic resin at the time of sealing and ribs that are at an opposite side to the gate opening with the circuit board between the ribs, and tops of the ribs making contact with the circuit board.

3 Claims, 19 Drawing Sheets

(51) Int. Cl.
*H02K 5/08* (2006.01)
*H02K 5/15* (2006.01)
*H02K 5/22* (2006.01)

(58) Field of Classification Search
USPC .......................................... 310/51, 81, 401
See application file for complete search history.

(56) References Cited

FOREIGN PATENT DOCUMENTS

| | | | |
|---|---|---|---|
| JP | 2001-128408 A | | 5/2001 |
| JP | 2003172300 A | * | 6/2003 |
| JP | 2005-299412 A | | 10/2005 |
| JP | 2009-112067 A | | 5/2009 |
| WO | WO-2019112245 A1 | * | 6/2019 ........... F04D 19/002 |

OTHER PUBLICATIONS

International Search Report for corresponding International Application No. PCT/JP2021/006690 mailed Apr. 27, 2021.
Written Opinion for corresponding International Application No. PCT/JP2021/006690 dated Apr. 9, 2021.

* cited by examiner

FAN MOTOR

CROSS-REFERENCE TO RELATED APPLICATIONS

This application is a national stage entry of International Application No. PCT/JP2021/006690 filed on Feb. 22, 2021, which claims the benefit of priority to Japanese Application No. JP2020-059255, filed Mar. 30, 2020, the entire disclosures of which are hereby incorporated herein by reference.

BACKGROUND

A fan motor is a device that cools down the inside of a personal computer, OA equipment, or the like by rotating a fan (blades) and using the wind power to discharge the heat generated inside to the outside.

A fan motor that can be used at places exposed to water or oil or places with a lot of dust by sealing (molding) an internal stator and a circuit board with a synthetic resin (for example, see Patent Literature 1) has been proposed. Although this fan motor is a type that is electrically connected to the outside by a lead wire, a fan motor using a connector for electrical connection to the outside, instead of a lead wire, has also been known (for example, see Patent Literature 2). This fan motor is configured with the connector protruding from the side surface of a fan housing outward in a diameter direction, and connector pins arranged inside the connector are connected to a circuit board. When sealing is performed in a housing provided with such a connector, a gate opening of a synthetic resin is often provided in the vicinity of the connector for easy access to the outside.

CITATION LIST

Patent Literature

Patent Literature 1: JP 2001-128408
Patent Literature 2: WO 2019/112245

SUMMARY

However, when a synthetic resin is injected from the gate opening in the vicinity of the connector after the stator and the circuit board are surrounded by a mold, the circuit board may be deformed by the injection pressure of the injected synthetic resin. When the deformation is large, defects such as cracks at solder bonding parts of the connector pins or peeling of the solder bonding parts may occur.

The present invention has been made to solve the aforementioned problems, and an object of the present invention is to provide a fan motor capable of preventing deformation of a circuit board even when a connector housing is formed integrally with a housing and a gate opening of a synthetic resin is disposed in the vicinity of the connector.

Solution to Problem

In order to solve the problem described above and achieve the object, a fan motor according to an aspect of the present invention includes a bearing holder, a stator, a circuit board, and a synthetic resin. The bearing holder is tubular and is formed by insert molding with a base part that is integral with a housing and a connector housing. The stator is mounted at an outer circumference of the bearing holder. The circuit board is electrically connected to a coil of the stator, is mounted at a surface of the base part at an opposite side to the bearing holder, and extends from the base part to the connector housing. The synthetic resin seals the bearing holder, the stator, and the circuit board, except for both end faces of the bearing holder. The connector housing has a gate opening that is injected with the synthetic resin at the time of sealing and ribs that are at an opposite side to the gate opening with the circuit board between the ribs, and tops of the ribs making contact with the circuit board.

A fan motor according to an aspect of the present invention can prevent deformation of a circuit board even when a connector housing is formed integrally with a housing and a gate opening of a synthetic resin is disposed in the vicinity of the connector.

DESCRIPTION OF EMBODIMENTS

Figure 1:
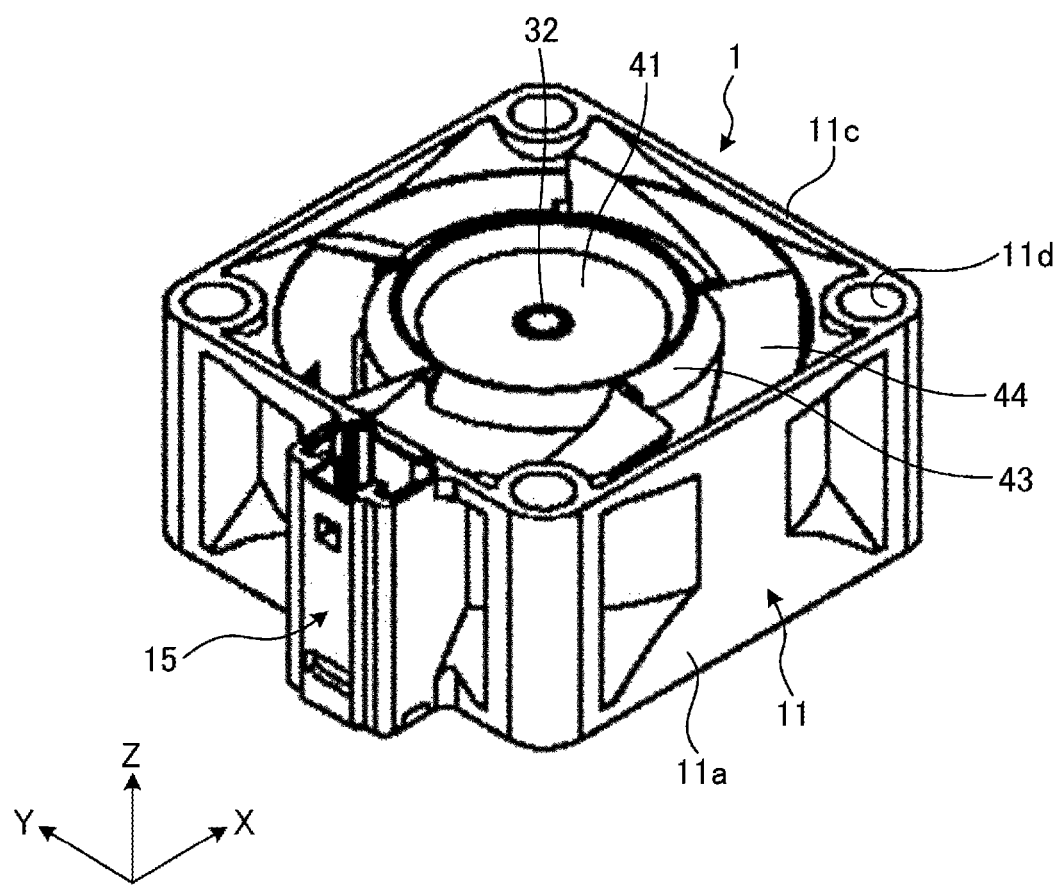
FIG. 1 is an external perspective view illustrating a configuration example of a fan motor according to an embodiment.

A fan motor according to an embodiment will be described below with reference to the drawings. Note that the present invention is not limited to the embodiment described above. Further, the dimensional relationships, proportions, and the like between elements in the drawings may differ from reality. Among the drawings, parts having mutually different dimensional relationships and proportions may be included. Furthermore, the contents described in one embodiment or modification are applied in principle to other embodiments or modified examples.

Figure 2:
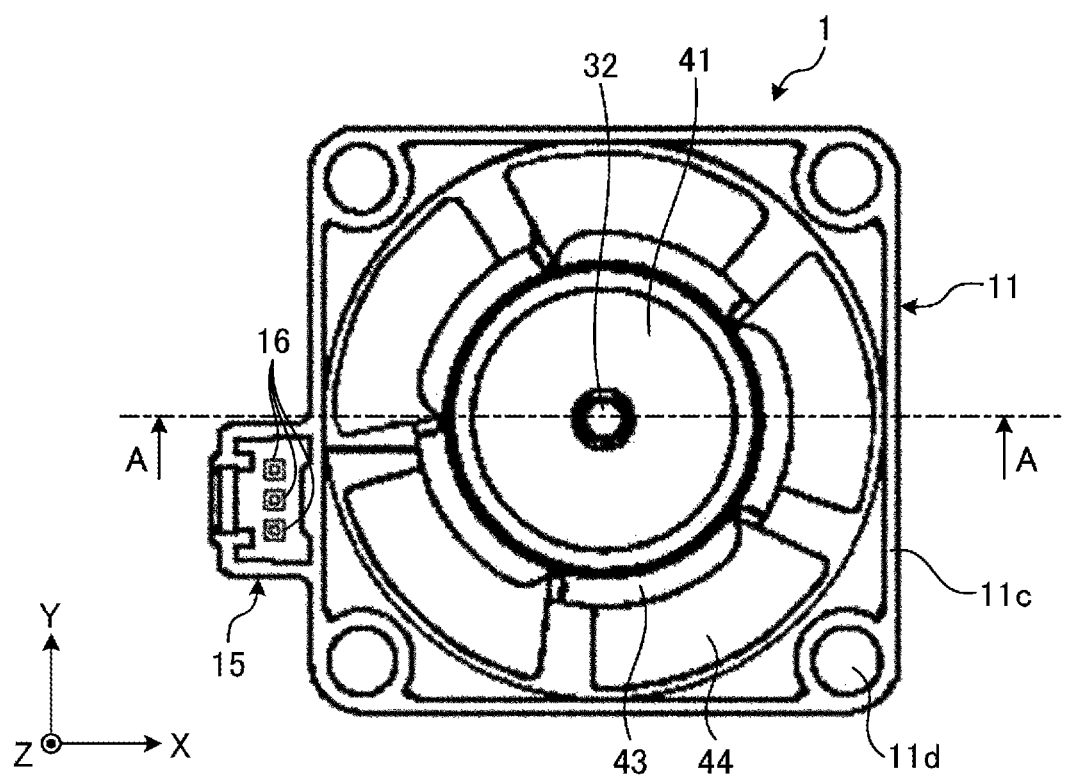
FIG. 2 is a plan view of the fan motor in FIG. 1.
Figure 3:
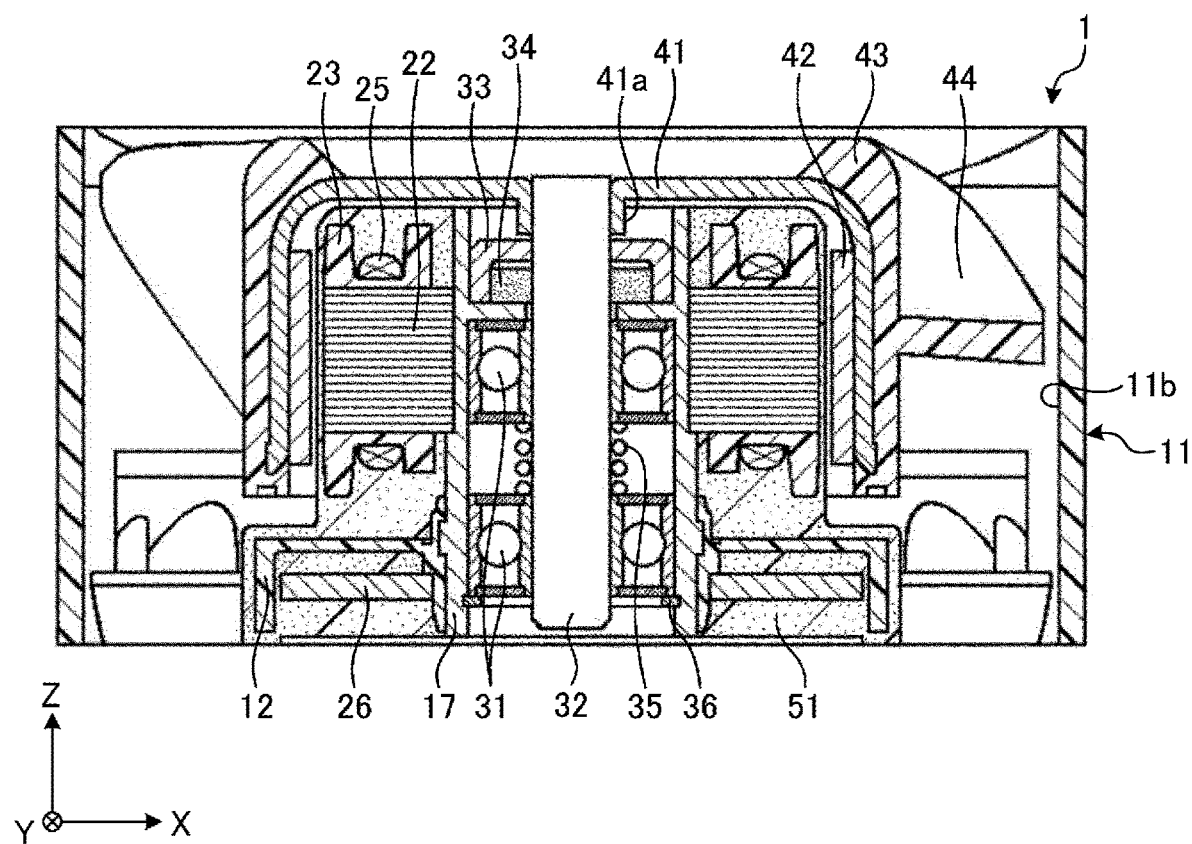
FIG. 3 is a cross-sectional view taken along line A-A of the fan motor in FIG. 2.

FIG. 1 is an external perspective view illustrating a configuration example of a fan motor 1 according to an embodiment. For convenience, an axial direction (rotary axis direction) of the fan motor 1 is referred to as a Z-axis direction, and two orthogonal sides of a housing 11 in a longitudinal direction are referred to as an X-axis direction and a Y-axis direction, respectively. FIG. 2 is a plan view of the fan motor 1 in FIG. 1. FIG. 3 is a cross-sectional view taken along line A-A of the fan motor 1 in FIG. 2.

Figure 4:
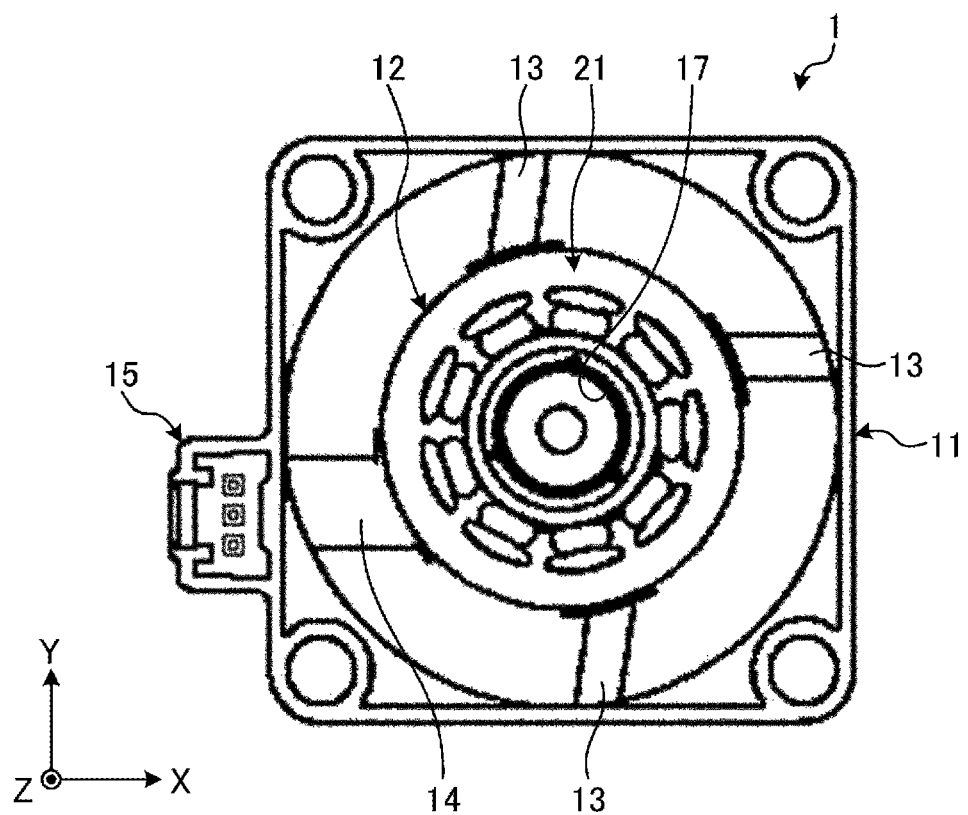
FIG. 4 is a plan view illustrating a state where a stator is mounted at a bearing holder formed by insert molding with a base part integrally molded with a housing.
Figure 5:
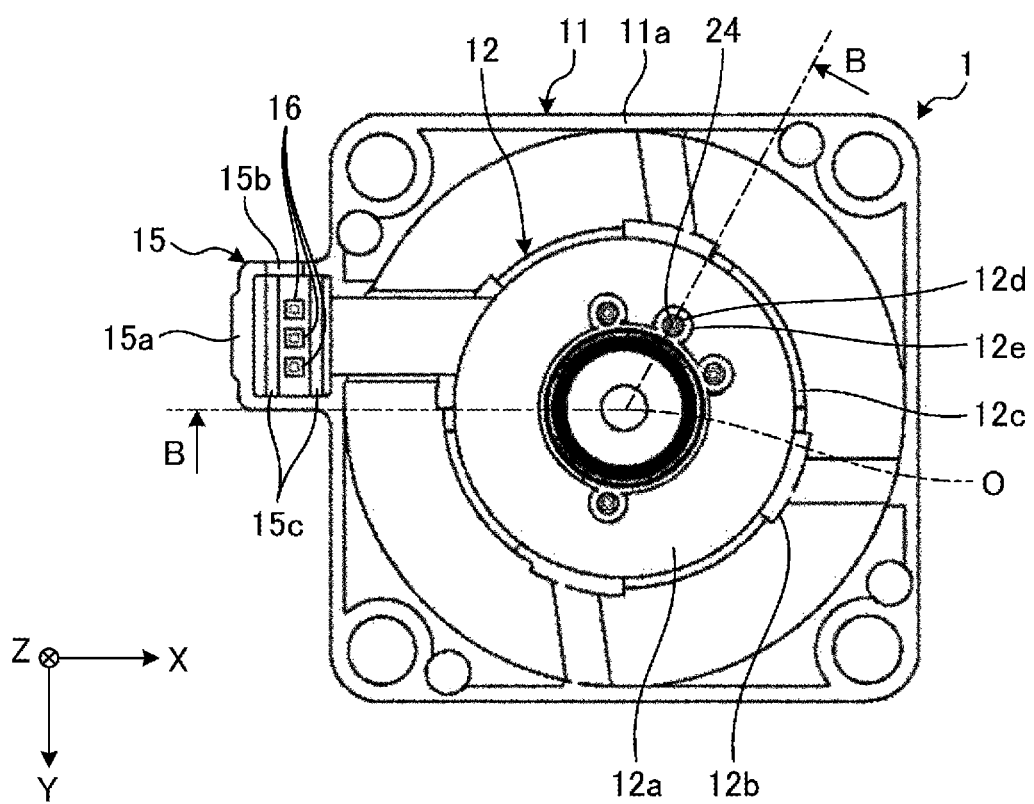
FIG. 5 is a bottom view of the fan motor in FIG. 4.
Figure 6:
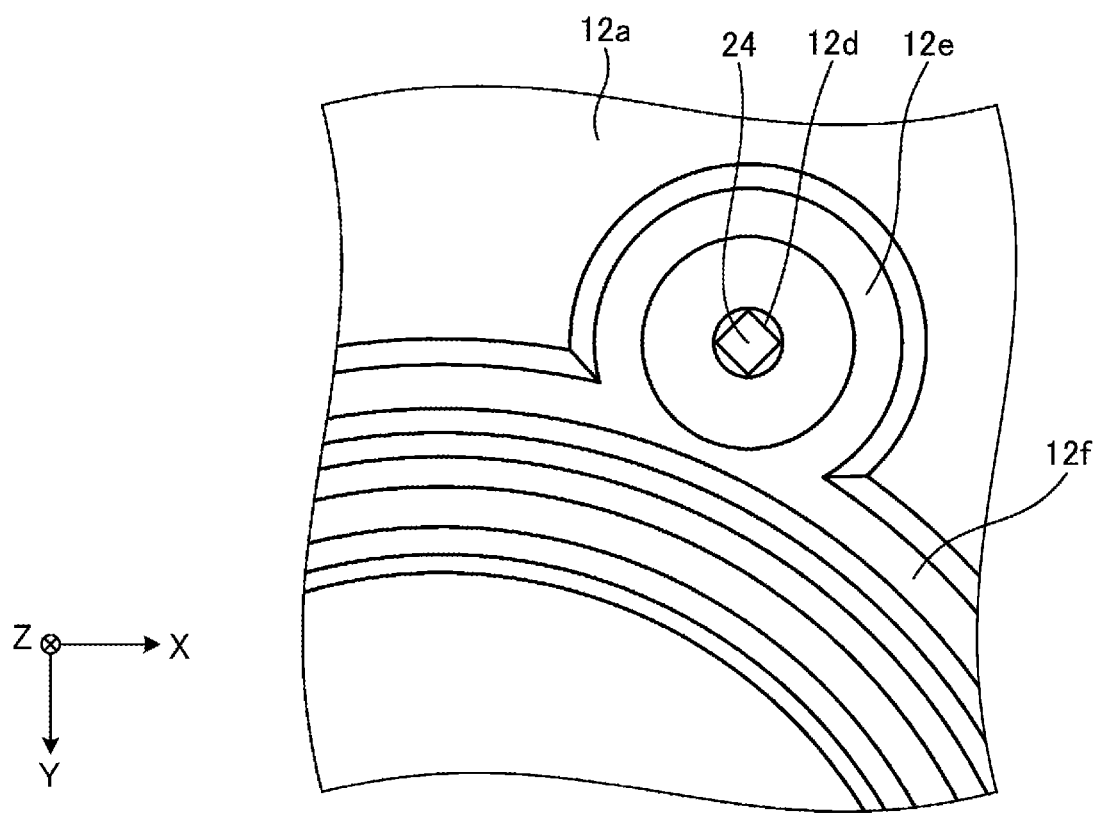
FIG. 6 is an enlarged view of the vicinity of a penetrating hole and a rib in FIG. 5.
Figure 7:
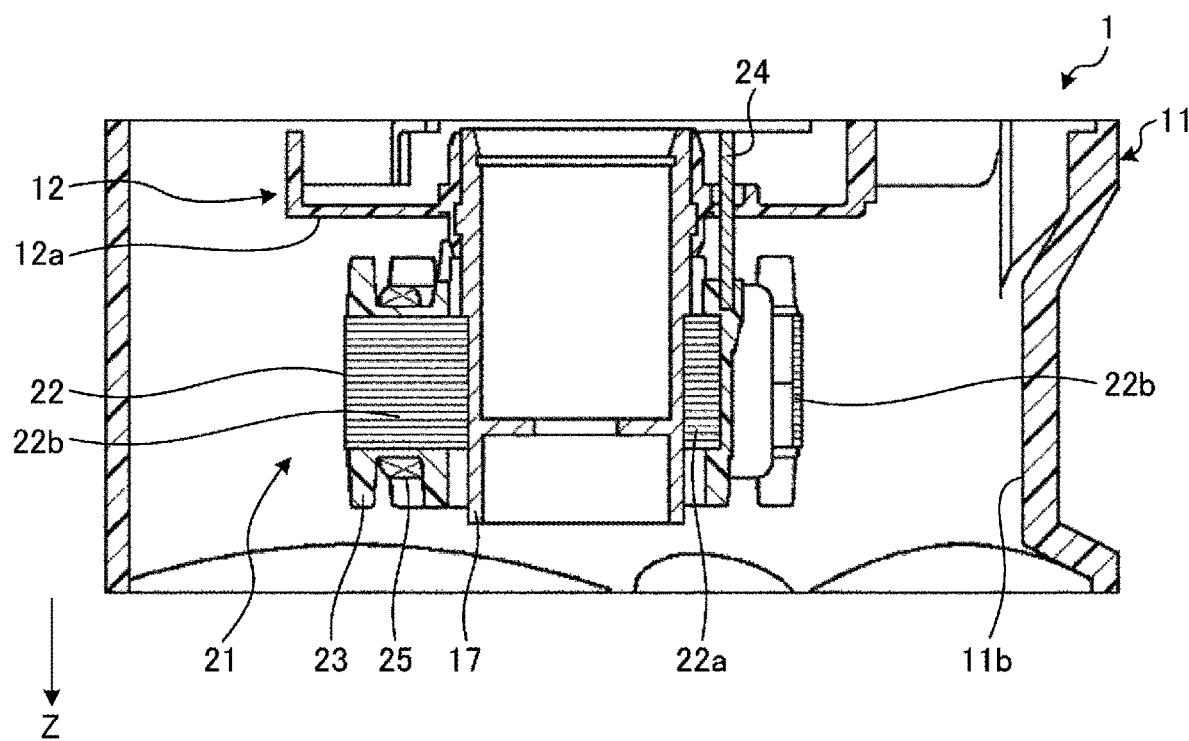
FIG. 7 is a cross-sectional view taken along line B-O-B of the fan motor in FIG. 5.

FIG. 4 is a plan view illustrating a state where a stator 21 is mounted at a bearing holder 17 formed by insert molding with a base part 12 integrally molded with the housing 11. FIG. 5 is a bottom view of the fan motor 1 in FIG. 4. FIG. 6 is an enlarged view of the vicinity of a penetrating hole 12d and a rib 12e in FIG. 5. FIG. 7 is a cross-sectional view taken along line B-O-B of the fan motor 1 in FIG. 5.

Figure 8:
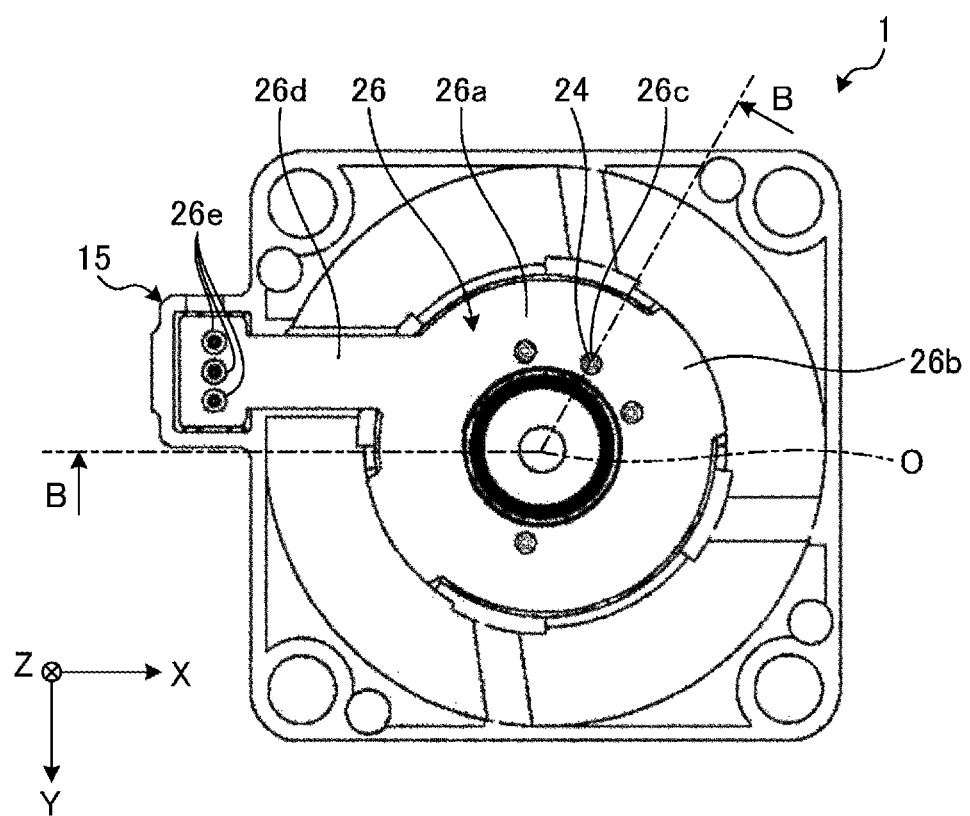
FIG. 8 is a bottom view illustrating a state where a circuit board is mounted in the state in
FIG. 5.
Figure 9:
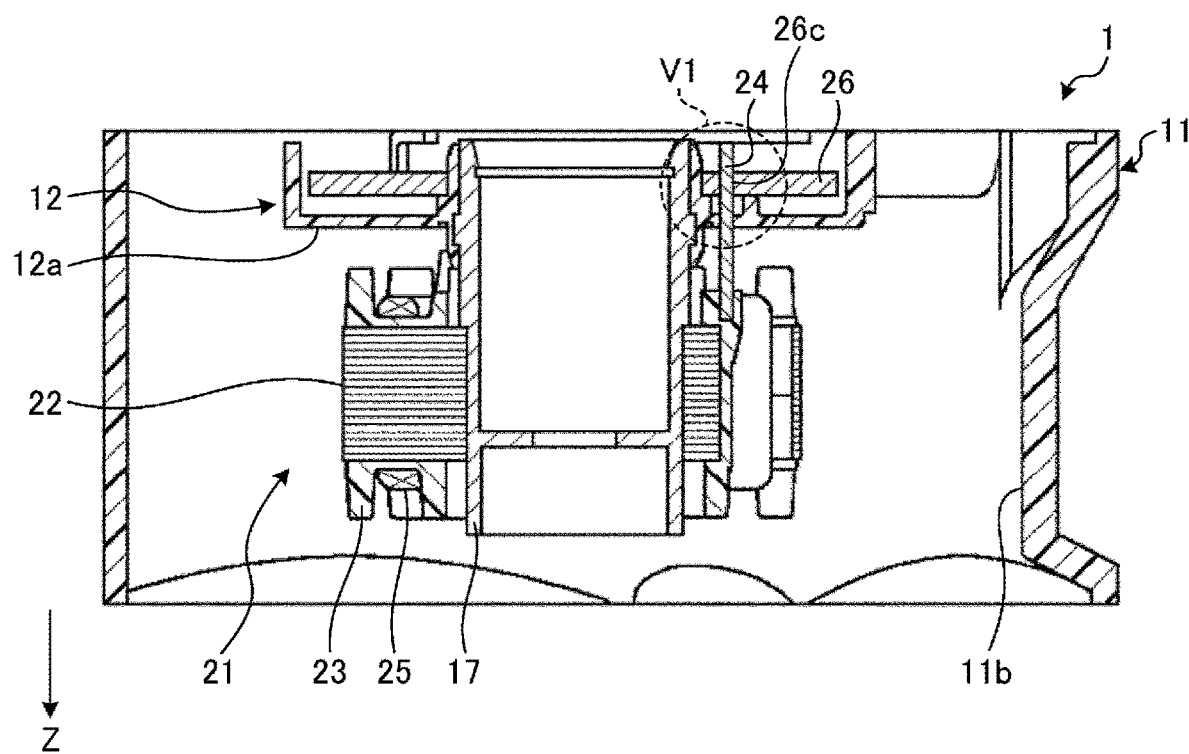
FIG. 9 is a cross-sectional view taken along B-O-B of the fan motor in FIG. 8.
Figure 10:
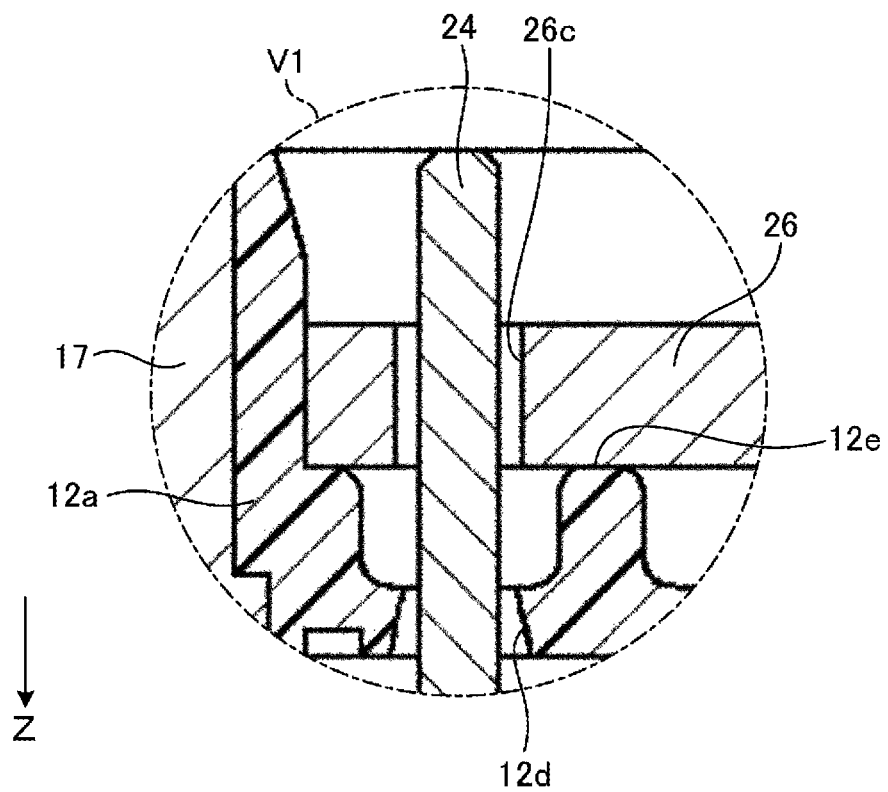
FIG. 10 is an enlarged cross-sectional view of a range V1 in FIG. 9.

FIG. 8 is a bottom view illustrating a state where a circuit board 26 is mounted in the state in FIG. 5. FIG. 9 is a cross-sectional view taken along line B-O-B of the fan motor 1 in FIG. 8. FIG. 10 is an enlarged cross-sectional view of a range V1 in FIG. 9.

Figure 11:
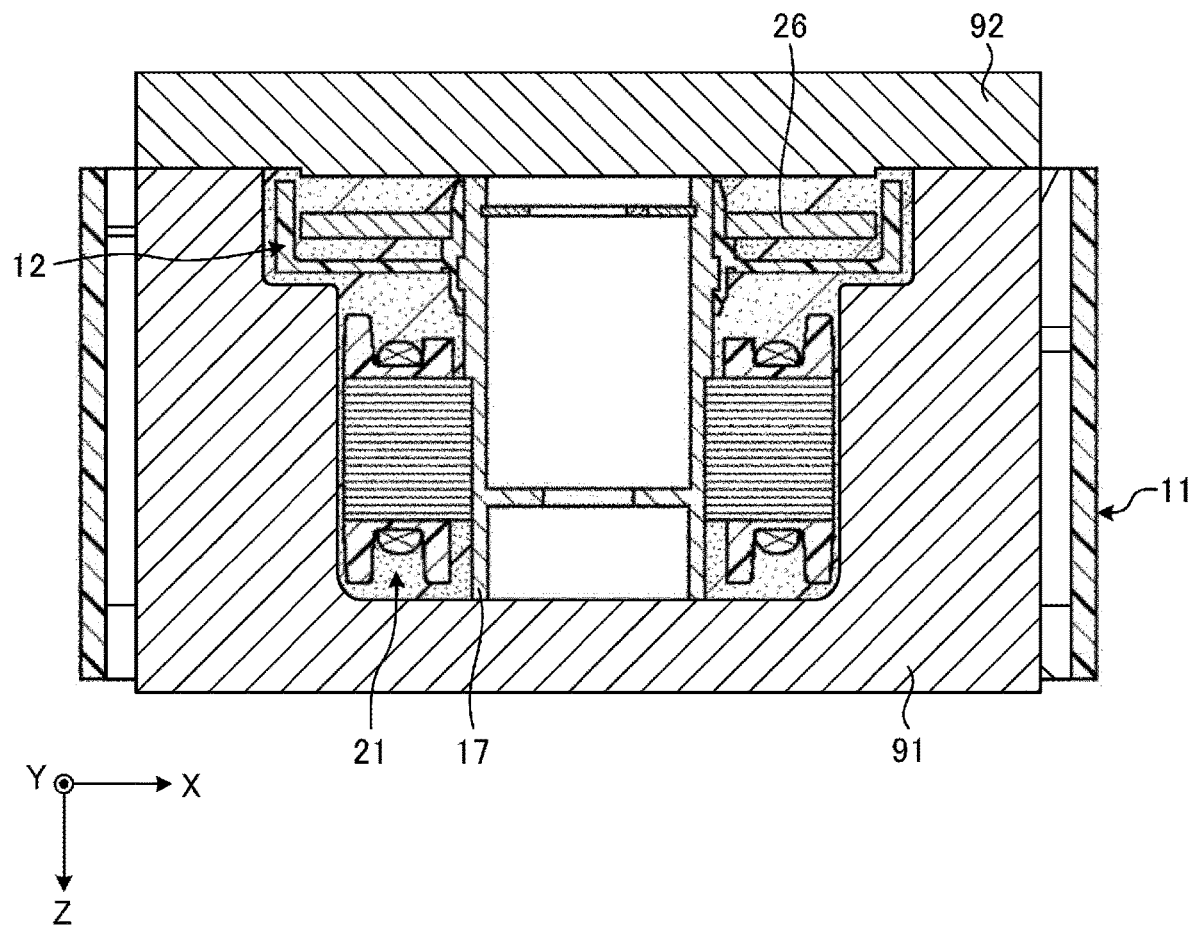
FIG. 11 is a cross-sectional view illustrating a state where the base part, the bearing holder, the stator, and the circuit board are sealed by molds.
Figure 12:
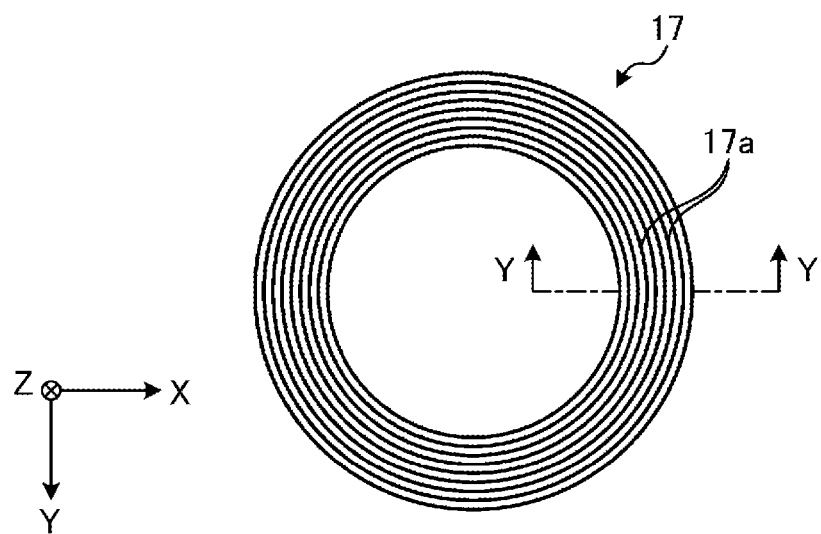
FIG. 12 is a view (bottom view) when one end part of the bearing holder is viewed from an axial direction.
Figure 13:
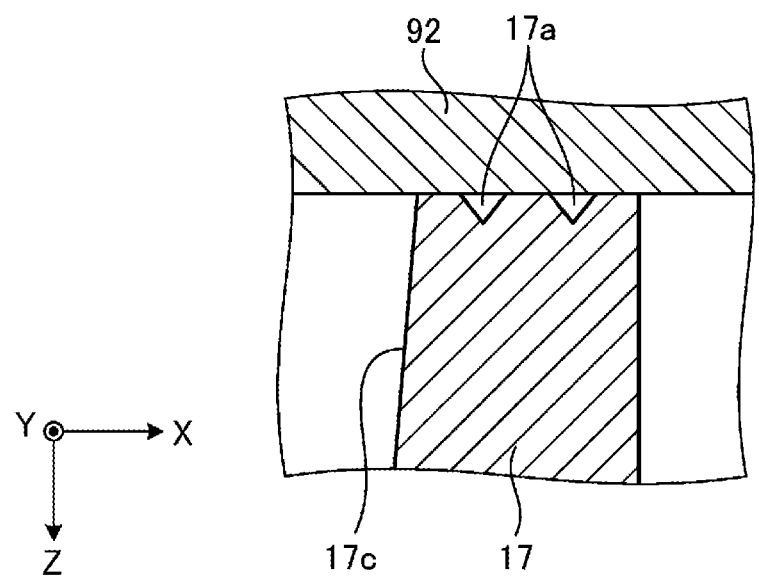
FIG. 13 is a cross-sectional view taken along line Y-Y in FIG. 12.
Figure 14:
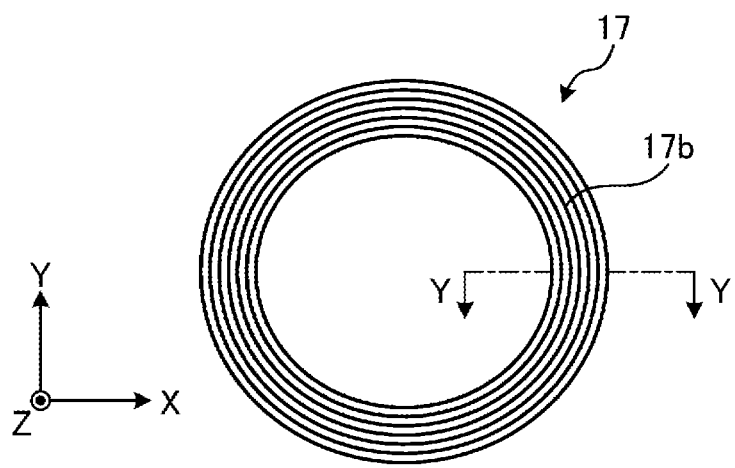
FIG. 14 is a view (plan view) when the other end part of the bearing holder is viewed from the axial direction.
Figure 15:
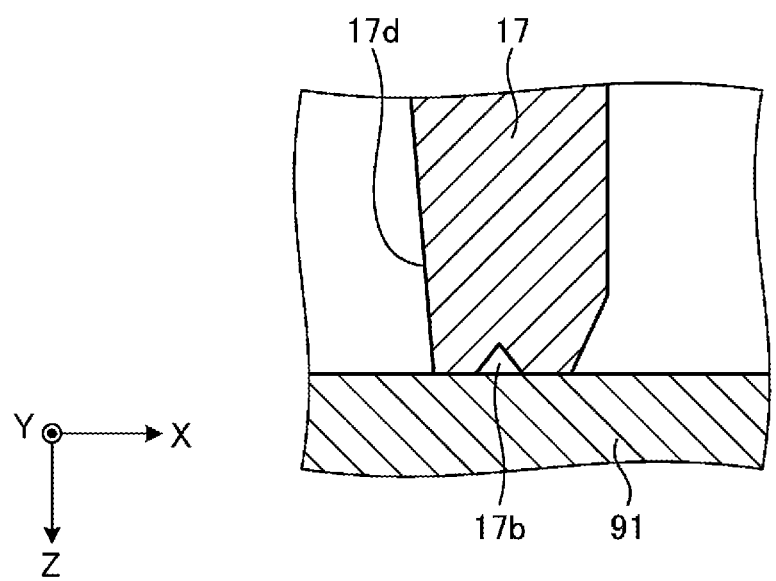
FIG. 15 is a cross-sectional view taken along line Y-Y in FIG. 14.
Figure 16:
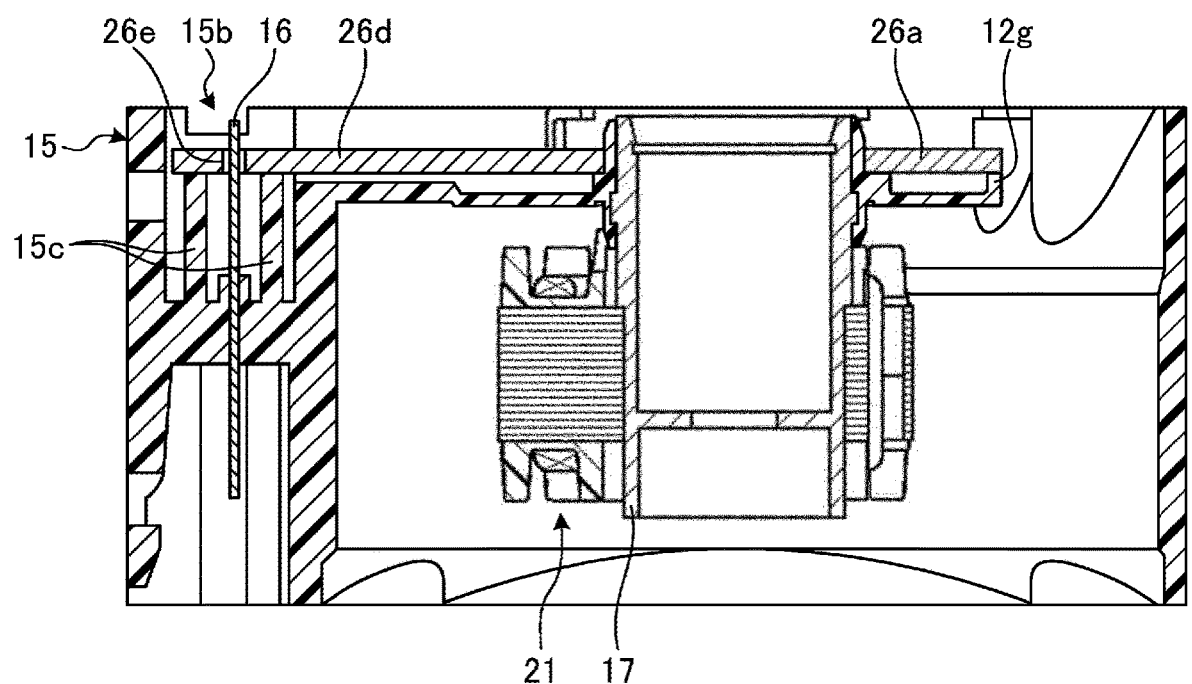
FIG. 16 is a cross-sectional view through a connector housing of the fan motor.

FIG. 11 is a cross-sectional view illustrating a state where the base part 12, the bearing holder 17, the stator 21, and the circuit board 26 are sealed by molds 91 and 92. FIG. 12 is a view (bottom view) when one end part of the bearing holder 17 (mold 92 side) is viewed from the axial direction. FIG. 13 is a cross-sectional view taken along line Y-Y in FIG. 12. FIG. 14 is a view (plan view) when the other end part of the bearing holder 17 (mold 91 side) is viewed from the axial direction. FIG. 15 is a cross-sectional view taken along line Y-Y in FIG. 14. FIG. 16 is a cross-sectional view through a connector housing 15 of the fan motor 1.

The structure of the fan motor 1 will be described below in accordance with a manufacturing process.

Manufacturing of Housing

Mainly in FIG. 1 to FIG. 10, in a state where the bearing holder 17 having a hollow cylindrical shape and made of a non-magnetic metal material, such as brass, is inserted, the housing 11, the base part 12, spokes 13 (including a wide part 14), and the connector housing 15 are integrally molded by injection molding of a thermoplastic resin.

The housing 11 is provided with a frame part 11a constituting an outer frame, a wind tunnel part 11b that has a hollow cylindrical shape, and a substantially quadrangular flange 11c at both end faces of the wind tunnel part 11b in the axial direction. At four corners of the flange 11c, insertion holes 11d for inserting mounting screws or the like are provided. The base part 12 and a plurality of the spokes 13 (including the wide part 14) are provided at one end side of the wind tunnel part 11b in the axial direction, and the connector housing 15 is integrally molded with a part of the outer peripheral part of the housing 11. The connector housing 15 is provided with a frame part 15a connected to the housing 11, and a plurality of connector pins 16 are inserted into the connector housing 15 and integrally molded with the connector housing 15.

The base part 12 has an annular part 12a, and the bearing holder 17 is disposed at the center of the base part 12. A cylindrical outer peripheral wall 12b is formed at an outer peripheral edge of the annular part 12a, and one end of the outer peripheral wall 12b in the axial direction is open. Furthermore, notches 12c for engaging with projecting parts 26b (FIG. 8) formed at an outer peripheral edge of the circuit board 26 are formed at a plurality of positions of the outer peripheral wall 12b.

The spokes 13 (including the wide part 14) are disposed on an outer peripheral surface of the outer peripheral wall 12b along a circumferential direction, and couple the outer peripheral surface of the outer peripheral wall 12b and the inner peripheral surface of the frame part 11a of the housing 11. Furthermore, one of the spokes 13 is wider than the other spokes 13 as the wide part 14, and extends toward the connector housing 15, and an extending part 26d of the circuit board 26 is disposed at this position.

At the time of molding the base part 12, the base part 12 is formed with the penetrating holes 12d for inserting a plurality of terminal pins 24 disposed in insulators 23 of the stator 21, and the ribs 12e surrounding the penetrating holes 12d are integrally molded at the side where the circuit board 26 is disposed (FIG. 5 and FIG. 6). The rib 12e is formed to surround the penetrating hole 12d and the bearing holder 17. Furthermore, the penetrating hole 12d formed at the base part 12 is formed in a conical shape having a diameter decreasing toward the side where the circuit board 26 is disposed. Functions of the rib 12e and the penetrating hole 12d will be described below.

Manufacturing of Stator, Mounting of Stator, and Mounting of Circuit Board

Mainly in FIG. 1 to FIG. 10, a stator core 22 constituting the stator 21 is configured by stacking a plurality of thin plate-shaped core pieces in the axial direction. The stator core 22 includes an annular core back 22a and a plurality of teeth 22b radially extending from the core back 22a outward in a diameter direction. The core piece is made of a soft magnetic electromagnetic steel sheet or the like by press working or the like.

The insulators 23 each made of an insulating synthetic resin material are mounted from both sides of the stator core 22 in the axial direction, and a coil 25 is wound around each of the teeth 22b via the insulators 23. A terminal of the coil 25 is tied up and connected to the terminal pin 24 disposed at one side of the insulator 23 in the axial direction, and is soldered (joined) to manufacture the stator 21.

An opening of the core back 22a of the stator core 22 constituting the stator 21 is fitted to the outer peripheral surface of the bearing holder 17. At this time, the terminal pins 24 are inserted into the penetrating holes 12d formed at the annular part 12a of the base part 12, respectively (FIGS. 4 to 7).

Thereafter, the circuit board 26 mounted with electronic components and the like is mounted from an opening of the outer peripheral wall 12b of the base part 12 (FIG. 8 to FIG. 10). The circuit board 26 includes a disc part 26a and an extending part 26d extending from a part of an outer peripheral edge of the disc part 26a outward in a diameter direction, and a plurality of convex parts 26b protruding outward in the diameter direction are formed at an outer peripheral edge of the disc part 26a. The convex part 26b is positioned by engaging with a notch 12c (FIG. 5) formed at the outer peripheral wall of the base part 12.

When the circuit board 26 is mounted, a tip end of each terminal pin 24 is inserted through the penetrating hole 12d formed at the base part 12 from the opening of the outer peripheral wall 12b of the base part 12, and then is inserted through a through hole 26c formed at a land part of a wiring pattern of the circuit board 26. Similarly, a tip end of each connector pin 16 is inserted through a through hole 26e (FIG. 16) formed at the land part of the wiring pattern of the circuit board 26. Then, the tip end of the terminal pin 24 protruding from the land part of the wiring pattern of the circuit board 26 and the tip end of the connector pin 16 are soldered, respectively.

On the other hand, the penetrating hole 12d and the rib 12e integrally molded at the time of molding the base part 12 serve to prevent flux and solder balls from scattering. That is, when the terminal pins 24 and the wiring pattern of the circuit board 26 are electrically connected by soldering, even though the flux and the solder balls are scattered due to boiling of the flux due to heat during the soldering, the rib 12e is formed to surround the penetrating hole 12d, so that the flux and the solder balls are collected inside the rib 12e and prevented from scattering around.

Furthermore, the rib 12e is connected to another rib 12f (FIG. 6) on the base part 12 surrounding the end part of the bearing holder 17. This enables stable contact between the circuit board 26 and the rib 12e, and makes it possible to more effectively prevent the flux and the solder balls from scattering during soldering.

The penetrating hole 12d formed at the base part 12 is formed in a conical shape having a diameter that decreases toward the side where the circuit board 26 is disposed. Therefore, when the terminal pin 24 is soldered, even if solder that flows through the through hole 26c of the circuit board 26 and forms a back fillet flows into the penetrating hole 12d of the base part 12, the solder accumulates inside the rib 12e and furthermore, since the penetrating hole 12d is formed in a conical shape, the penetrating hole 12d functions as a taper seal, and the solder is prevented from flowing out of the penetrating hole 12d.

Sealing with Synthetic Resin

Mainly in FIG. 11 to FIG. 16, the stator 21 connected with the circuit board 26 is set between molds 91 and 92, and transfer molding is performed using, for example, an epoxy resin as a synthetic resin 51. The epoxy resin seals the entire outer peripheral surface of the stator core 22, the coil 25, and the circuit board 26 having the electronic components mounted on the circuit board 26.

A gate opening (resin injection gate) 15b of the epoxy resin injected into the molds 91 and 92 is disposed at the location of the connector (FIG. 5 and FIG. 16). The epoxy resin injected into the molds 91 and 92 from the gate opening 15b collides with the inside of the housing 11 by a predetermined injection pressure, and then is separated and spreads in all directions. Of the epoxy resin separated in four directions, since the epoxy resin flowing in the direction of the circuit board 26 presses against a surface (referred to as a gate surface of the circuit board 26 for convenience) of the circuit board 26 on the gate opening 15b side, the circuit board 26 is to be deformed by the injection pressure of the resin.

Since the connector pin 16 is soldered to the wiring pattern of the circuit board 26, stress concentrates on the soldered part, but inside the connector housing 15, ribs 15c integrally molded with the connector housing 15 make contact with a surface (referred to as a back surface of the circuit board 26 for convenience) opposite to the surface of the circuit board 26 on the gate opening 15b side. Therefore, the ribs 15c that make contact with the back surface of the circuit board 26 prevent the circuit board 26 from being deformed by the injection pressure of the epoxy resin. The ribs 15c are provided in two rows in the arrangement direction of the connector pins 16 with the connector pins 16 between the ribs 15c, so that deformation of the circuit board 26 (extending part 26d) at the root of the connector pins 16 can be more effectively prevented.

Since the vicinity of the gate opening 15b is most affected by the injection pressure of the epoxy resin, the ribs 15c are formed inside the connector housing 15 and are allowed to make contact with the back surface of the circuit board 26, but deformation is prevented even at places other than the inside of the connector housing 15. For example, a rib 12g that makes contact with the back surface of the circuit board 26 is also formed at a back surface of the disc part 26a, so that the circuit board 26 is prevented from being deformed by the injection pressure of the epoxy resin.

On the other hand, annular recesses (grooves) 17a and 17b are formed at both end faces in the axial direction of the bearing holder 17 that makes contact with the molds 91 and 92 (FIG. 12 to FIG. 15). In the present embodiment, a plurality of rows (two rows) of the annular recesses 17a are concentrically formed at one end face of the bearing holder 17 in the axial direction (mold 92 side) (FIG. 12 and FIG. 13), and one row of the annular recesses 17b are formed at the other end face of the bearing holder 17 in the axial direction (mold 91 side) (FIG. 14 and FIG. 15). The annular recesses 17a and 17b illustrated in the drawings are assumed to have an acute-angled cross-sectional shape on the side far from the end face of the bearing holder 17 in the axial direction, but may have a substantially arc-shaped cross-sectional shape on the side far from the end face of the bearing holder 17 in the axial direction.

When the molds 91 and 92 are clamped, the height dimension of the stator 21 in the axial direction is made to be in a predetermined dimensional range, but when a slight gap occurs between the end face of the bearing holder 17 in the axial direction and the molds 91 and 92 due to variations in dimensions, the epoxy resin injected into cavities of the molds 91 and 92 penetrates into the slight gap between the end face of the bearing holder 17 in the axial direction and the molds 91 and 92. However, since the epoxy resin that has penetrated into the slight gap enters the annular recesses 17a and 17b formed at the end face of the bearing holder 17 and is filled into the annular recesses 17a and 17b, the epoxy resin does not reach the inner peripheral surface of the bearing holder 17.

In this way, the epoxy resin that has penetrated into the slight gap between the end face of the bearing holder 17 in the axial direction and the molds 91 and 92 enters and fills the annular recesses 17a and 17b formed at the end face of the bearing holder 17, and thus resin burrs do not reach the inner peripheral surface of the bearing holder 17, so that bearings 31 can be easily mounted at the bearing holder 17. The inner peripheral surfaces 17c and 17d of both end faces of the bearing holder 17 have a tapered shape having a diameter reduced toward the inside from the end face side, and easily enter the inner surface of the bearing holder 17 when the bearings 31 are mounted, thereby facilitating the mounting.

Manufacturing and Mounting of Rotor

Mainly in FIG. 1 to FIG. 3, a protrusion 41a is formed by burring at the center of a cup-shaped rotor yoke 41 made of a soft magnetic material, and a rotary shaft 32 is press-fitted into the protrusion 41a. Then, the rotor yoke 41 coupled with the rotary shaft 32 is inserted, and a cup-shaped hub 43 and a plurality of blades 44 on an outer peripheral surface of the hub 43 are integrally molded on an outer circumference of the rotor yoke 41 by injection molding of a thermoplastic resin. Moreover, an annular magnet 42 is fixed to an inner peripheral surface of the rotor yoke 41.

On the other hand, two bearings 31 are fitted to the bearing holder 17 with preload springs 35 between the two bearings 31 from both ends of the bearing holder 17 in the axial direction, and the rotary shaft 32 of a rotor is rotatably supported by the bearings 31. A grease retaining plate 33 is mounted at the rotary shaft 32, and a seal grease 34 is filled into the grease retaining plate 33, and a retaining ring 36 is mounted at an end part side of the rotary shaft 32 at an opposite side to the rotor yoke 41. The bearing 31 is waterproofed with the seal grease 34.

Comparative Examples

Figure 17:
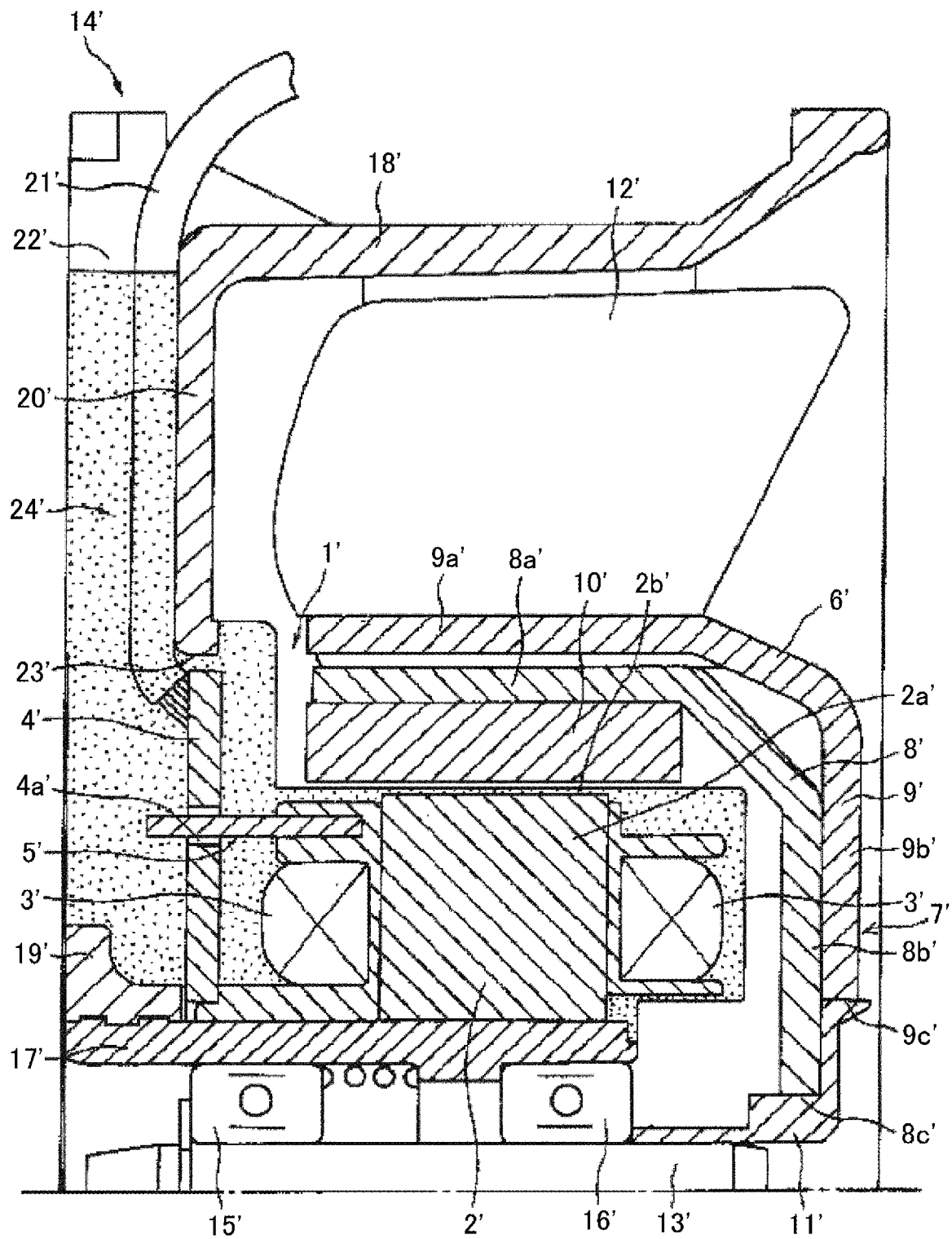
FIG. 17 is a cross-sectional view illustrating a configuration example of Comparative Example #1.

FIG. 17 is a cross-sectional view illustrating a configuration example of Comparative Example #1, and is a cross-sectional view (half omitted) through a rotary axis of a waterproof brushless fan motor disclosed in JP 2001-128408. In FIG. 17, the fan motor includes a housing part 18' surrounding an outer circumference of a plurality of blades 12' of a rotor 6', and a rotary shaft 13' of the rotor 6' is rotatably supported by bearings 15' and 16' housed in a bearing support tubular part 17'. In a state where a stator 1', a circuit board 4' including electronic components, and a lead wire 21' are housed in a stator side case 14', a molding part 24' is formed by molding with an epoxy resin, and pole surfaces 2b' of stator poles are also covered with the molding part 24'.

A control circuit and a winding 3' on the circuit board 4' are electrically connected to terminal pins 5' soldered to an electrode on the circuit board 4' through a through hole 4a' of the circuit board 4' because lead wires of the winding 3' are wound around the terminal pin 5'. Therefore, when the terminal pins 5' and the circuit board 4' are electrically connected by soldering, flux or solder balls may scatter due to boiling of the flux due to heat during the soldering.

Furthermore, the end face of the bearing support tubular part 17' is in close contact with an inner surface of a mold, but when a slight gap occurs between the end face of the bearing support tubular part 17' and the inner surface of the mold, a part of a molten resin enters the slight gap, causing resin burrs. There is no particular problem as long as the resin burrs stay on the end face of the bearing support tubular part 17', but when the resin burrs reach an inner peripheral surface of the bearing support tubular part 17', the bearings 15' and 16' are not mountable at the inner peripheral surface of the bearing support tubular part 17' and excess resin burrs need to be removed.

Description is omitted for an iron core 2', a protruding pole part 2a', the winding 3', a rotor side case 7', a cup member 8', a tubular part 8a', a bottom wall part 8b', a penetrating hole 8c', a blade mounting hub 9', a tubular part 9a', a bottom wall part 9b', a rotor magnetic pole 10', a bush 11', a board storage part 19', a web 20', a lead wire storage groove 22', and a communication passage 23'.

Figure 18:
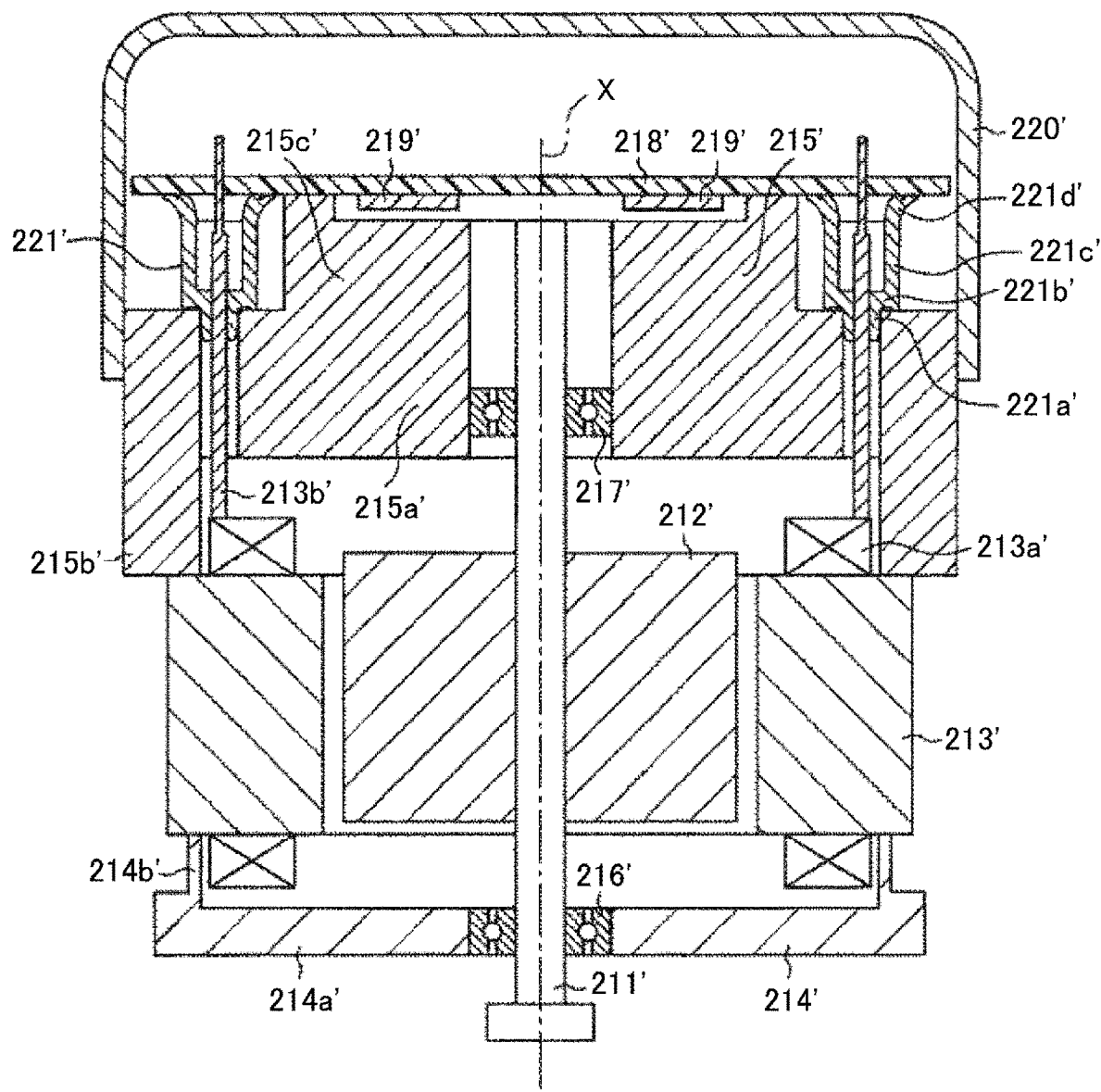
FIG. 18 is a cross-sectional view illustrating a configuration example of Comparative Example #2.

FIG. 18 is a cross-sectional view illustrating a configuration example of Comparative Example #2, and is a cross-sectional view through a rotary shaft of a rotary electric machine disclosed in JP 2018-007303. In FIG. 18, a motor as a rotary electric machine includes a rear frame end 215' formed with a frame penetrating hole, a winding extending part 213b', and a control board 218' that is soldered to the winding extending part 213b'. Furthermore, the motor includes a grommet 221' that is provided in the rear frame end 215' at an opposite side to a stator core 213' while being inserted into the frame penetrating hole. The grommet 221' includes a main body part 221a' formed with an insertion hole for inserting the winding extending part 213b', and a bottom receiving part 221b' extending from the outside of the main body part 221a' intersecting a direction of extension of the insertion hole. The grommet 221' includes a side wall part 221c' extending from an outer marginal part of the bottom receiving part 221b' to a side of the control board 218' in the extension direction of the insertion hole.

Description is omitted for a rotary shaft 211', a rotor 212', a stator winding 213a', a front frame end 214', a front body part 214a', a front peripheral wall part 214b', a rear body part 215a', a heat sink part 215c', a front bearing 216', an electronic component 219', a cover 220', and an enlarged diameter part 221d'.

Even though solder balls are generated during soldering between the control board 218' and the winding extending part 213b', the solder balls can be confined in a space formed by the grommet 221' and the control board 218'. As a consequence, the solder balls can be prevented from scattering.

It is conceivable that the grommet 221' illustrated in Comparative Example #2 (FIG. 18) is applied to the terminal pins 5' of the circuit board 4' of Comparative Example #1 (FIG. 17) so as to prevent flux and solder balls from scattering when the terminal pins 5' and the circuit board 4' are electrically connected by soldering.

However, the configuration of mounting the grommet 221' as in Comparative Example #2 is not desirable because work is required to mount the same number of grommets 221' as the terminal pins 5', causing a decrease in work efficiency due to an increase in work man-hours and an increase in the number of parts, resulting in an increase in the cost of the fan motor.

In this regard, in the present embodiment, by having, in a part of a circuit board facing a through hole to be soldered, a penetrating hole for inserting a terminal pin to be soldered to the through hole, and ribs that surround the penetrating hole and have tops making contact with the circuit board, solder can be prevented from flowing into a surface at an opposite side to a surface subjected to soldering, and flux and solder balls can be prevented from scattering at the time of soldering between the terminal pin and the circuit board without increasing the number of parts.

Figure 19:
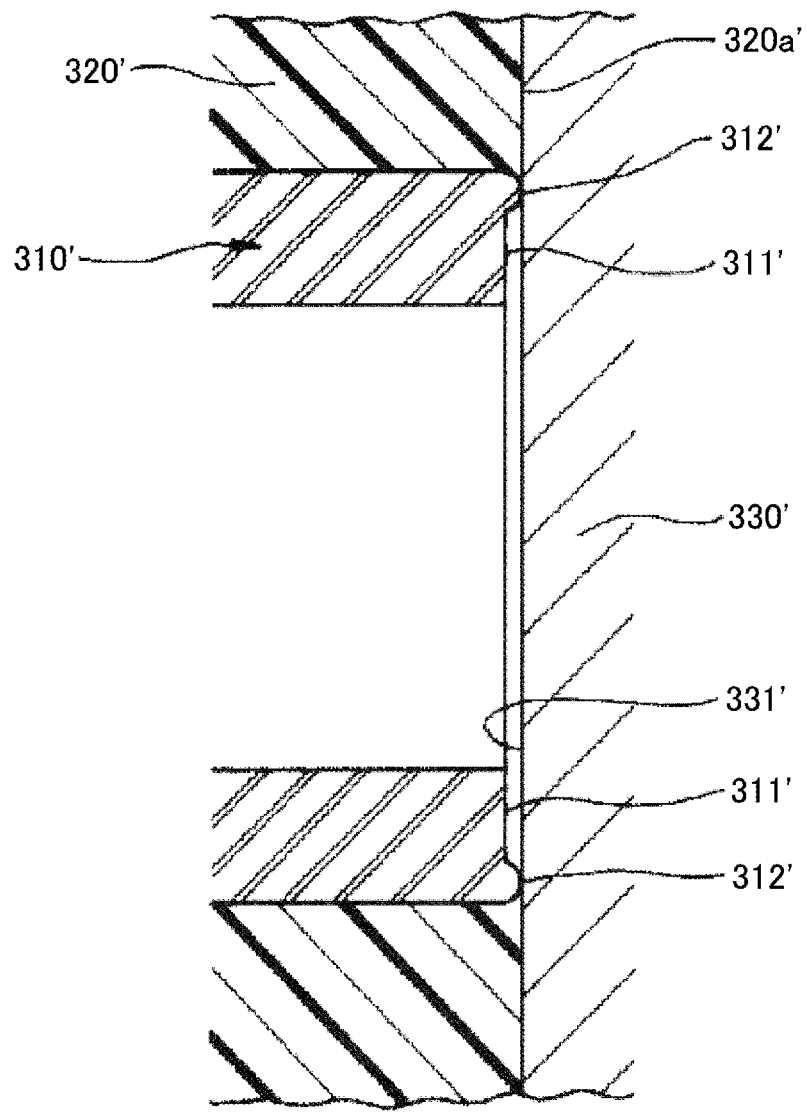
FIG. 19 is a cross-sectional view illustrating a configuration example of Comparative Example #3.

FIG. 19 is a cross-sectional view illustrating a configuration example of Comparative Example #3, and is a cross-sectional view of an insert metal and a mold disclosed in JP 05-269791. In FIG. 19, in an insert metal 310' inserted into a cavity of a mold 330', an annular projection 312', by mold clamping, comes into close contact with an inner surface 331' of the mold 330' over an entire circumference with an appropriate crush margin. Description of a resin material 320' and a resin surface 320a' is omitted.

This prevents the generation of resin burrs on an exposed surface 311' side of the insert metal 310' as a result of being sealed at a pressure contact part between the projection 312' and the inner surface 331' of the mold.

It is conceivable that the annular projection 312' illustrated in Comparative Example #3 (FIG. 19) is applied to an end part of the bearing support tubular part 17' of Comparative Example #1 (FIG. 17) so as to prevent the generation of resin burrs on the end face of the bearing support tubular part 17'.

However, in the production method of the resin molded product having the insert metal of Comparative Example #3, since the annular projection 312' formed at an outer diameter part of the exposed surface 311' of the insert metal 310' is pressed against the inner surface 331' of the mold 330' with a crushing margin, when the thickness dimension in the radial direction of the bearing support tubular part 17' corresponding to the insert metal 310' is small, the bearing support tubular part 17' may be deformed. In a small axial fan, since the bearing support tubular part 17' is required to be reduced in size, and, inevitably, the thickness dimension in the radial direction of the bearing support tubular part 17' is small and the bearing support tubular part 17' is easily deformed. When the bearing support tubular part 17' is deformed, there is a problem that a bearing is not mountable at the inner peripheral surface of the bearing support tubular part 17'.

In this regard, in the present embodiment, since one or more annular recesses are provided at both end faces of a bearing holder to prevent the penetration of a synthetic resin, resin burrs can be prevented from being formed at the inner peripheral surface of the bearing holder without causing deformation of the bearing holder even in a small fan motor.

Embodiments of the present invention have been described above, but the present invention is not limited to the embodiments described above, and various modifications are possible without departing from the spirit of the present invention.

As described above, a fan motor according to an embodiment includes a bearing holder that is tubular and formed by insert molding with a base part that is integral with a housing and a connector housing, a stator that is mounted at an outer circumference of the bearing holder, a circuit board that is electrically connected to a coil of the stator, is mounted at a surface of the base part at an opposite side to the bearing holder, and extends from the base part to the connector housing, and a synthetic resin that seals the bearing holder, the stator, and the circuit board, except for both end faces of the bearing holder, wherein the connector housing includes a gate opening that is injected with the synthetic resin at the time of sealing and ribs that are at an opposite side to the gate opening with the circuit board between the ribs, tops of the ribs making contact with the circuit board. This makes it possible to prevent deformation of the circuit board even when the connector housing is formed integrally with the housing and the gate opening of the synthetic resin is disposed in the vicinity of the connector.

Furthermore, the ribs are provided in two rows with connector pins between the ribs, the connector pins being disposed inside the connector housing. This makes it possible to more effectively prevent deformation of the circuit board at the root of the connector pins.

Furthermore, the base part has another rib having a top that makes contact with the circuit board. This makes it possible to prevent deformation of the circuit board at places other than the connector.

Moreover, the present invention is not limited to the embodiment described above. A configuration obtained by appropriately combining the above-mentioned constituent elements is also included in the present invention. Further effects and modifications can be easily derived by a person skilled in the art. Thus, a wide range of aspects of the present invention is not limited to the embodiment described above, and may be modified variously.

REFERENCE SIGNS LIST

1 Fan motor, 11 Housing, 12 Base part, 12*d* Penetrating hole, 12*e*,12*f*,12*g* Rib, 13 Spokes, 14 Wide part, 15 Connector housing, 15*b* Gate opening, 15*c* Ribs, 16 Connector pin, 17 Bearing holder, 21 Stator, 22 Stator core, 23 Insulator, 24 Terminal pin, 25 coil, 26 Circuit board, 26*a* Disc part, 26*d* Extending part, 31 Bearing, 32 Rotary shaft, 33 Grease retaining plate, 34 Seal grease, 35 Preload springs, 36 Retaining ring, 41 Rotor yoke, 42 Magnet, 43 Hub, 44 Blade, 51 Synthetic resin, 91,92 Mold

The invention claimed is:

1. A fan motor comprising:
a bearing holder that is tubular and formed by insert molding with a base part that is integral with a housing and a connector housing; a stator that is mounted at an outer circumference of the bearing holder; a circuit board that is electrically connected to a coil of the stator, is mounted at a surface of the base part at an opposite side to the bearing holder, and extends from the base part to the connector housing; and a synthetic resin that seals the bearing holder, the stator, and the circuit board, except for both end faces of the bearing holder, wherein
the connector housing includes a gate opening that is injected with the synthetic resin at the time of sealing and ribs that are at an opposite side to the gate opening with the circuit board between the ribs, and tops of the ribs making contact with the circuit board.

2. The fan motor according to claim 1, wherein
the ribs are provided in two rows with connector pins between the ribs, the connector pins being disposed inside the connector housing.

3. The fan motor according to claim 1, wherein
the base part includes another rib having a top that makes contact with the circuit board.

* * * * *